United States Patent
Srinivasaiah et al.

(10) Patent No.: US 9,535,666 B2
(45) Date of Patent: Jan. 3, 2017

(54) DYNAMIC AGENT DELIVERY

(71) Applicant: AppDynamics Inc., San Francisco, CA (US)

(72) Inventors: Vinay Srinivasaiah, San Francisco, CA (US); Bradley Winslow, Torrance, CA (US)

(73) Assignee: AppDynamics, Inc., San Francisco, CA (US)

(*) Notice: Subject to any disclaimer, the term of this patent is extended or adjusted under 35 U.S.C. 154(b) by 0 days.

(21) Appl. No.: 14/609,298

(22) Filed: Jan. 29, 2015

(65) Prior Publication Data

US 2016/0224322 A1 Aug. 4, 2016

(51) Int. Cl.
*G06F 9/44* (2006.01)
*G06F 9/455* (2006.01)
*G06F 9/445* (2006.01)

(52) U.S. Cl.
CPC ............. *G06F 8/315* (2013.01); *G06F 8/30* (2013.01); *G06F 8/33* (2013.01); *G06F 9/4406* (2013.01); *G06F 9/44589* (2013.01); *G06F 9/45533* (2013.01)

(58) Field of Classification Search
CPC .......... G06F 8/33; G06F 8/36; G06F 9/44589; G06F 9/445; G06F 9/30
USPC ......................................... 717/111, 118, 110
See application file for complete search history.

(56) References Cited

U.S. PATENT DOCUMENTS

| | | | |
|---|---|---|---|
| 5,958,010 A | 9/1999 | Agarwal et al. | |
| 6,026,237 A * | 2/2000 | Berry | G06F 9/44521 717/130 |
| 6,125,382 A | 9/2000 | Brobst et al. | |
| 6,336,148 B1 * | 1/2002 | Doong | G07F 17/0014 719/316 |
| 6,336,213 B1 | 1/2002 | Beadle et al. | |
| 6,470,494 B1 | 10/2002 | Chan | |
| 6,477,666 B1 * | 11/2002 | Sanchez et al. | 714/41 |
| 6,493,816 B1 | 12/2002 | Munroe | |
| 6,651,108 B2 | 11/2003 | Popp | |
| 6,662,359 B1 * | 12/2003 | Berry et al. | 717/130 |

(Continued)

FOREIGN PATENT DOCUMENTS

| | | |
|---|---|---|
| GB | 2 518 739 | 4/2015 |
| WO | WO 2015/058204 | 4/2015 |
| WO | 2016069040 A1 | 5/2016 |

OTHER PUBLICATIONS

Czajkowski et al., "JRes: A Resource Accounting Interface for Java", 1998.*

(Continued)

*Primary Examiner* — Phillip H Nguyen
(74) *Attorney, Agent, or Firm* — Bachmann Law Group

(57) ABSTRACT

The present technology utilizes agents to monitor and report data from Java virtual machines (JVM) to a controller as part of application performance monitoring. When a JVM is loaded, code defining an interface for agents is loaded as well. A determination may be made as to whether the loaded agent implements the interface defined at the JVM. If the loaded agent does not implement the interface, for example if it is missing one or more methods defined by the interface, the agent class may be modified to define the missing methods. The modification to the agent class may be made after compilation but before the class is loaded into the JVM.

21 Claims, 6 Drawing Sheets

(56) References Cited

U.S. PATENT DOCUMENTS

| | | | |
|---|---|---|---|
| 7,054,361 B1 | 5/2006 | Otte et al. | |
| 7,367,025 B1 | 4/2008 | Nikolov et al. | |
| 7,587,487 B1 | 9/2009 | Gunturu | |
| 7,957,934 B2* | 6/2011 | Greifeneder | G06F 11/3466 702/182 |
| 8,151,277 B2* | 4/2012 | Greifeneder | G06F 8/00 713/2 |
| 8,248,958 B1 | 8/2012 | Tulasi et al. | |
| 8,312,249 B1 | 11/2012 | Trumbell | |
| 8,676,901 B1 | 3/2014 | Nicolaou | |
| 8,863,093 B1* | 10/2014 | Chou et al. | 717/130 |
| 8,914,626 B1* | 12/2014 | Adogla et al. | 713/2 |
| 8,965,952 B1 | 2/2015 | Shatalin et al. | |
| 2001/0034016 A1 | 10/2001 | Ziv-el et al. | |
| 2002/0018481 A1 | 2/2002 | Mor et al. | |
| 2002/0173997 A1 | 11/2002 | Menard et al. | |
| 2002/0174174 A1 | 11/2002 | Ramraj | |
| 2003/0014549 A1 | 1/2003 | Seidman | |
| 2003/0093551 A1 | 5/2003 | Taylor et al. | |
| 2004/0006620 A1 | 1/2004 | Howard et al. | |
| 2004/0031020 A1* | 2/2004 | Berry | G06F 11/3409 717/130 |
| 2004/0039728 A1 | 2/2004 | Fenlon | |
| 2004/0081183 A1 | 4/2004 | Monza | |
| 2004/0153825 A1 | 8/2004 | Morimoto et al. | |
| 2005/0033767 A1 | 2/2005 | Kamentz | |
| 2005/0039190 A1 | 2/2005 | Rees et al. | |
| 2005/0091376 A1 | 4/2005 | Helfman | |
| 2005/0155024 A1 | 7/2005 | Wannamaker | |
| 2005/0165584 A1 | 7/2005 | Boody et al. | |
| 2005/0243837 A1 | 11/2005 | Boyd et al. | |
| 2005/0264581 A1 | 12/2005 | Patrick et al. | |
| 2005/0273709 A1 | 12/2005 | Lough et al. | |
| 2005/0281259 A1 | 12/2005 | Mitchell | |
| 2006/0041539 A1 | 2/2006 | Matchett et al. | |
| 2006/0059092 A1 | 3/2006 | Burshan et al. | |
| 2006/0072568 A1 | 4/2006 | Vaananen | |
| 2006/0155803 A1 | 7/2006 | Muramatsu | |
| 2006/0168526 A1 | 7/2006 | Stirbu | |
| 2006/0271395 A1 | 11/2006 | Harris | |
| 2006/0280181 A1 | 12/2006 | Brailas et al. | |
| 2007/0027742 A1 | 2/2007 | Emuchay et al. | |
| 2007/0067364 A1 | 3/2007 | Barbian et al. | |
| 2007/0088668 A1 | 4/2007 | Larab et al. | |
| 2007/0180227 A1 | 8/2007 | Akimoto | |
| 2008/0062993 A1 | 3/2008 | Levy et al. | |
| 2008/0098378 A1 | 4/2008 | Kilbane et al. | |
| 2008/0225748 A1 | 9/2008 | Khemani et al. | |
| 2008/0304518 A1 | 12/2008 | Cheng et al. | |
| 2009/0320030 A1 | 12/2009 | Ogasawara | |
| 2010/0088404 A1 | 4/2010 | Mani et al. | |
| 2010/0100890 A1 | 4/2010 | Dar | |
| 2010/0138703 A1 | 6/2010 | Bansal et al. | |
| 2010/0162204 A1 | 6/2010 | Baumann et al. | |
| 2010/0199259 A1* | 8/2010 | Quinn et al. | 717/106 |
| 2010/0287541 A1 | 11/2010 | Saunders et al. | |
| 2011/0222412 A1 | 9/2011 | Kompella | |
| 2011/0252395 A1 | 10/2011 | Charisius et al. | |
| 2011/0276683 A1 | 11/2011 | Goldschlag et al. | |
| 2011/0305160 A1 | 12/2011 | Green et al. | |
| 2012/0005166 A1 | 1/2012 | Pace et al. | |
| 2012/0047276 A1 | 2/2012 | Lindquist et al. | |
| 2012/0047494 A1 | 2/2012 | Unrein et al. | |
| 2012/0167057 A1 | 6/2012 | Schmich et al. | |
| 2012/0230225 A1 | 9/2012 | Matthews et al. | |
| 2012/0297371 A1 | 11/2012 | Greifeneder et al. | |
| 2012/0304172 A1 | 11/2012 | Greifeneder et al. | |
| 2013/0067074 A1 | 3/2013 | Allen et al. | |
| 2013/0117132 A1 | 5/2013 | Padwal et al. | |
| 2014/0059527 A1* | 2/2014 | Gagliardi | G06F 8/67 717/166 |
| 2014/0059528 A1* | 2/2014 | Gagliardi | G06F 8/67 717/170 |
| 2014/0283040 A1 | 9/2014 | Wilkerson et al. | |
| 2015/0067146 A1 | 3/2015 | Raker | |
| 2015/0113122 A1 | 4/2015 | Sunkara | |
| 2015/0124840 A1 | 5/2015 | Bergeron | |
| 2016/0124829 A1 | 5/2016 | Winslow et al. | |
| 2016/0124832 A1 | 5/2016 | Kumar et al. | |

OTHER PUBLICATIONS

Dmitriev, "Profiling Java Application Using Code Hotswapping and Dynamic Call Graph Revelation", 2004.*

Gregersen et al., "Javeleon: An Integrated Platform for Dynamic Software Updating and its Application in Self-systems", 2012.*

PCT Application No. PCT/US2014/061402 International Search Report and Written Opinion dated Jan. 21, 2015.

United Kingdom Application No. GB1413464.7, Search Report dated Jan. 27, 2015.

U.S. Appl. No. 14/530,633 Office Action mailed Mar. 12, 2015.

U.S. Appl. No. 14/530,436, Brad Winslow, Agent Dynamic Service, filed Oct. 31, 2014.

U.S. Appl. No. 14/530,633, Pankaj Kumar, Monitoring and Correlating a Binary Process in a Distributed Business Transaction, filed Oct. 31, 2014.

PCT Application No. PCT/US2015/013873 International Search Report and Written Opinion dated Jun. 9, 2015.

U.S. Appl. No. 14/018,349 Office Action mailed Jan. 22, 2016.

U.S. Appl. No. 14/018,349 Office Action mailed Sep. 11, 2015.

U.S. Appl. No. 14/058,200 Office Action mailed Feb. 1, 2016.

U.S. Appl. No. 14/058,200 Third-Party Submission mailed May 20, 2015.

U.S. Appl. No. 14/530,436 Office Action mailed Mar. 24, 2016.

U.S. Appl. No. 14/530,633 Office Action mailed Jun. 12, 2015.

U.S. Appl. No. 14/530,633 Office Action mailed Oct. 6, 2015.

* cited by examiner

DYNAMIC AGENT DELIVERY

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

In some application performance monitoring systems, agents are installed onto Java virtual machines (JVM) at start-up. The agents may be used over and over for a running system, but may become outdated over time. In particular, an interface definition loaded by a JVM for interfacing with an agent may change over time. As a result, older agents become obsolete and no longer function.

There is a need in the art for managing agents for monitoring systems that involve changing interfaces.

SUMMARY OF THE CLAIMED INVENTION

The present technology utilizes agents to monitor and report data from Java virtual machines (JVM) to a controller as part of application performance monitoring. When a JVM is loaded, code defining an interface for agents is loaded as well. A determination may be made as to whether the loaded agent implements the interface defined at the JVM. If the loaded agent does not implement the interface, for example if it is missing one or more methods defined by the interface, the agent class may be modified to define the missing methods.

The modification to the agent class may be made after compilation but before the class is loaded into the JVM. In some instances, the modification may be made by a class loader by byte code injection into the byte code class. As a result, the class may be modified to implement the interface without changing the source code of the agent. The modification by the class loader may be done to implement a dummy method, for example a method that throws an exception.

An embodiment may include a method for delivering an agent on a machine. The method may load an interface definition on a machine. An agent class may be analyzed, wherein the agent class is intended to implement an interface complying with the interface definition. The agent class may be modified to comply with the interface definition.

An embodiment may include a system for monitoring a business transaction. The system may include a processor, memory and one or more modules stored in memory and executable by the processor. When executed, the one or more modules may load an interface definition on a machine, analyze an agent class intended to implement an interface complying with the interface definition, and modify the agent class to comply with the interface definition.

DETAILED DESCRIPTION

The present technology utilizes agents to monitor and report data from Java virtual machines (JVM) to a controller as part of application performance monitoring. When a JVM is loaded, boot strap code is loaded to interface with an agent. The boot strap code defines an interface to be implemented by an agent class. Over time, the interface definition may change, and an agent that was able to implement an old version of the interface may not be able to implement an updated version of the interface.

The classes of the agent may be modified to properly implement the agent interface. The agent classes are compiled and then a class loader accesses the byte code for each class implementing the interface. A determination may be made as to whether the agent class implements the interface defined at the JVM. If the agent class does not implement the interface, for example if it is missing one or more methods defined by the interface, the agent class may be modified to define the missing methods.

The modification to the agent class may be made after compilation but before the class is loaded into the JVM. In some instances, the modification may be made by a class loader by byte code injection into the byte code class. As a result, the class may be modified to implement the interface without changing the source code of the agent. The modification by the class loader may be done to implement a dummy method, for example a method that throws an exception.

Figure 1:
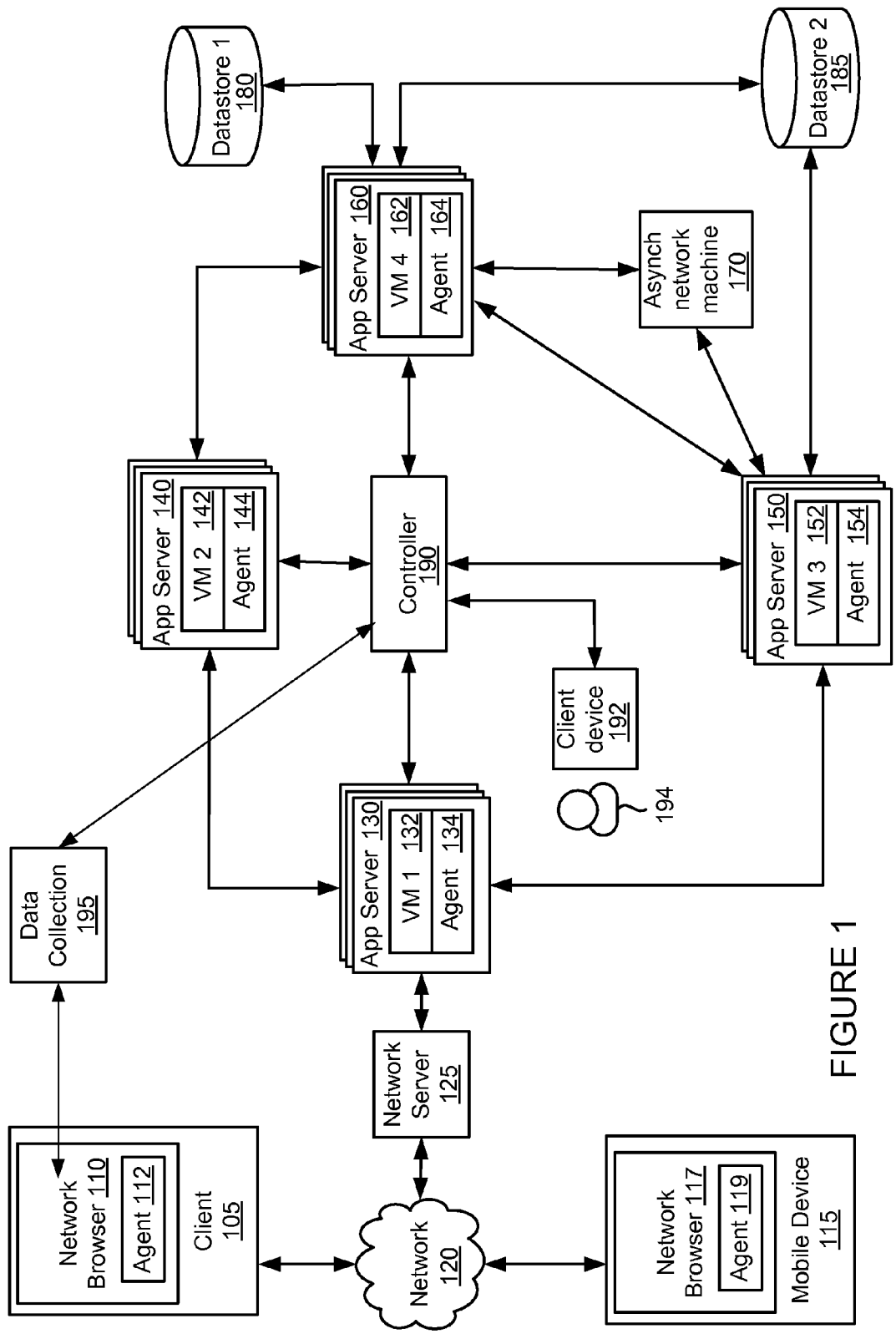
FIG. 1 is a block diagram of an exemplary system for monitoring a distributed application.

FIG. 1 is a block diagram of a system for monitoring a distributed application. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, tablet computer or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1, and may implement both an application server and network server on a single machine.

Application server 130 may include applications in one or more of several platforms. For example, application server 130 may include a Java application, .NET application, PHP application, C++ application, AJAX, or other application. Different platforms are discussed below for purposes of example only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Agent 134 may be a Java agent, .NET agent, PHP agent, or some other type of agent, for example based on the platform which the agent is installed on.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Controller 190 may collect and monitor customer usage data collected by agents on customer application servers and analyze the data. The controller may report the analyzed data via one or more interfaces, including but not limited to a dashboard interface and one or more reports.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
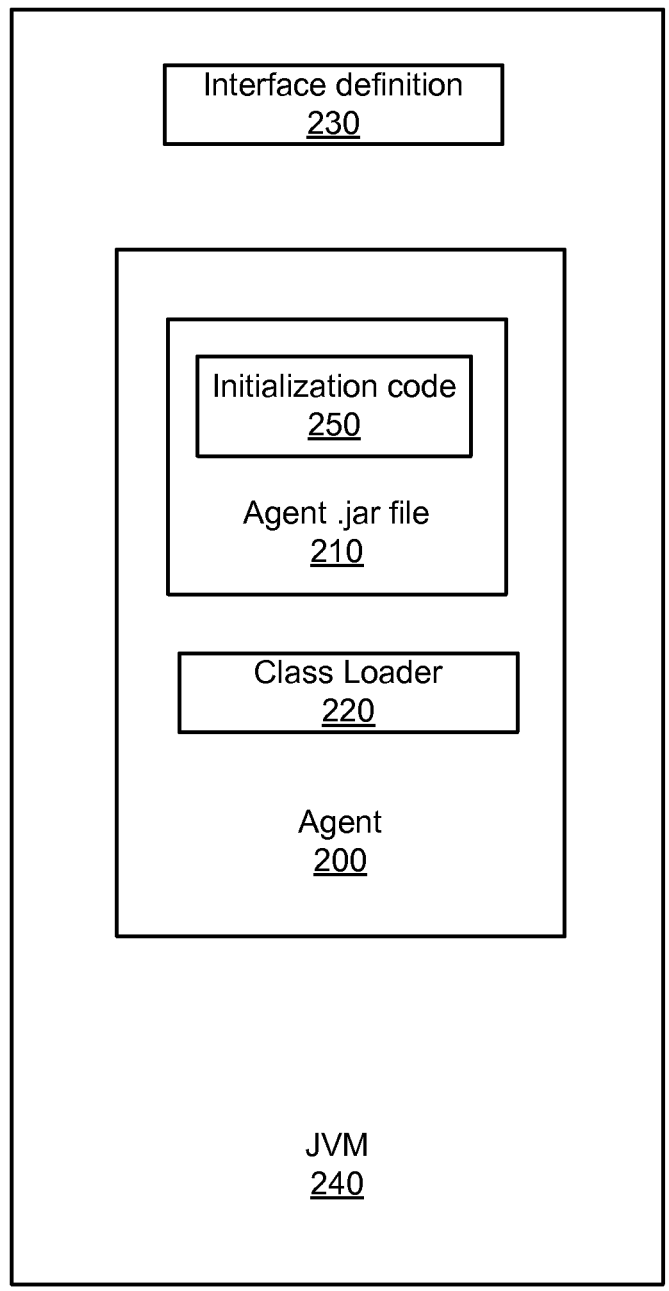
FIG. 2 is a block diagram of an agent.

FIG. 2 is a block diagram of an agent. Agent 200 may include an agent .jar file 210 and class loader 220. The agent may be installed on JVM 240 which includes an interface definition 230. Class loader 220 may load class files from the agent into the JVM. The agent .jar file 210 may include one or more files for analyzing the interface definition 230 and the agent class to implement the interface, and determine what methods are defined in the interface definition 230 but missing in the class. One or more classes in agent .jar file 210 may dynamically perform byte code injection to define the methods in the class, thereby configuring the class to properly implement the interface. In some instances, initialization code 250 within the agent .jar file may analyze the classes and modify the classes via byte code injection. The modified class is then provided to the class loader. When request is subsequently received to load the class, the modified class is provided rather than the original class.

Figure 3:
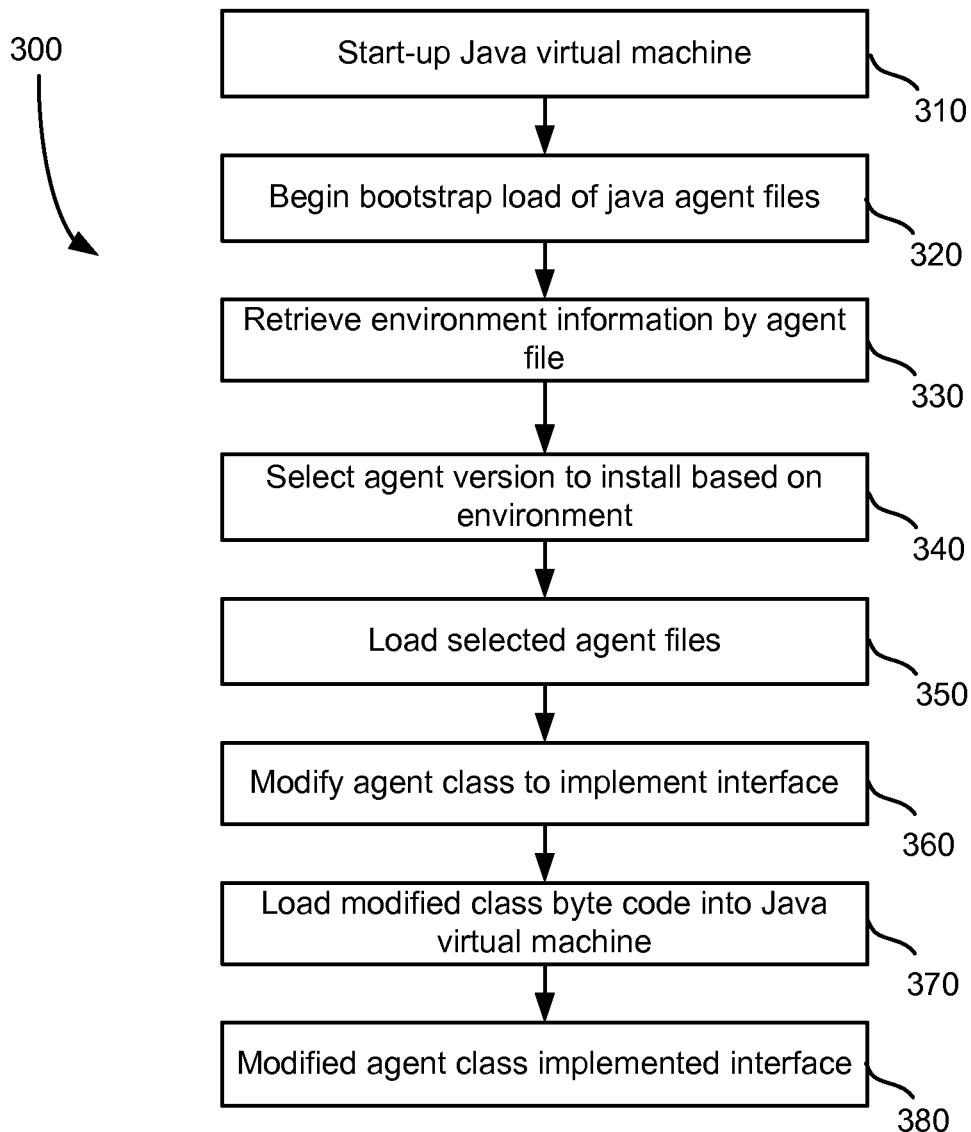
FIG. 3 is a method for loading an agent.

FIG. 3 is a method for loading an agent. First, a JVM is started up at step 310. During the JVM start-up, bootstrap Java agent files are loaded at step 320. The java agent file may include a .jar file that includes one or more files that implement the agent.

Environment information is retrieved by the agent file at step 330. The environment information may include controller information, node, tier or application information. At step 340, an agent version is selected to install onto the JVM based on the environment detected at step 330. Selected agent files for the agent version are loaded at step 350.

The agent class to implement an interface loaded into the JVM is then modified at step 360. The process for modifying the class may include analyzing the interface and the class and then modifying the class to be able to implement the interface. More details for modifying the agent class is discussed with respect to the method of FIG. 4.

The modified class byte code is loaded into a JVM at step 370. The modified agent class may then implement the interface at step 380 to allow for application monitoring and data collection.

Figure 4:
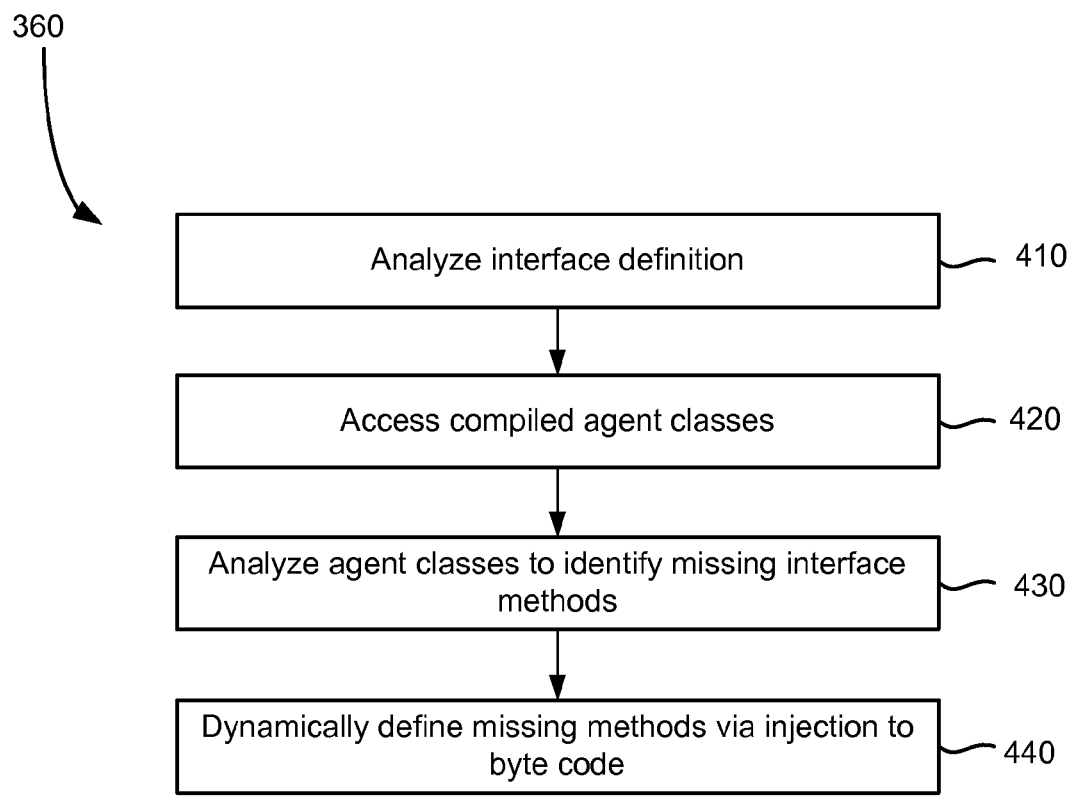
FIG. 4 is a method for configuring agent classes to implement an interface.

FIG. 4 is a method for configuring agent classes to implement an interface. The method of FIG. 4 provides more detail for step 360 of the method of FIG. 3. First, an interface definition is analyzed at step 410. The interface may be loaded into a JVM by agent bootstrap code and analyzed by a file in an agent .jar file. The interface definition may be analyzed for methods required to implement the definition.

Compiled agent classes are accessed at step 420. The compiled agent classes are then analyzed at step 430 by one or more agent .jar files, such as initialization code within the agent .jar file, to identify methods that are defined in the agent interface but not included in the class to implement the interface. The classes may be analyzed before they are loaded into the JVM so they can be changed before loading if needed.

Though analysis of the class is discussed with respect to identifying missing methods that appear in an agent interface definition, other discrepancies may be detected as well. For example, the present technology may be implemented in languages and platforms other than Java. In other languages, an analyzing module may analyze the agent files to determine if anything needs to be changed in order to interface with a corresponding interface on an application, machine or service to be monitored by the agent.

Returning to the method of FIG. 4, any methods determined to be missing from in the class to implement the interface are dynamically added via byte code injection at step 440. The injection may be performed by initialization code within the agent .jar file or other code that can access the classes after they are compiled into byte code and before they are loaded into a JVM. The modified classes may then be loaded into the JVM and may implement the interface as discussed with respect to FIG. 3.

Figure 5:
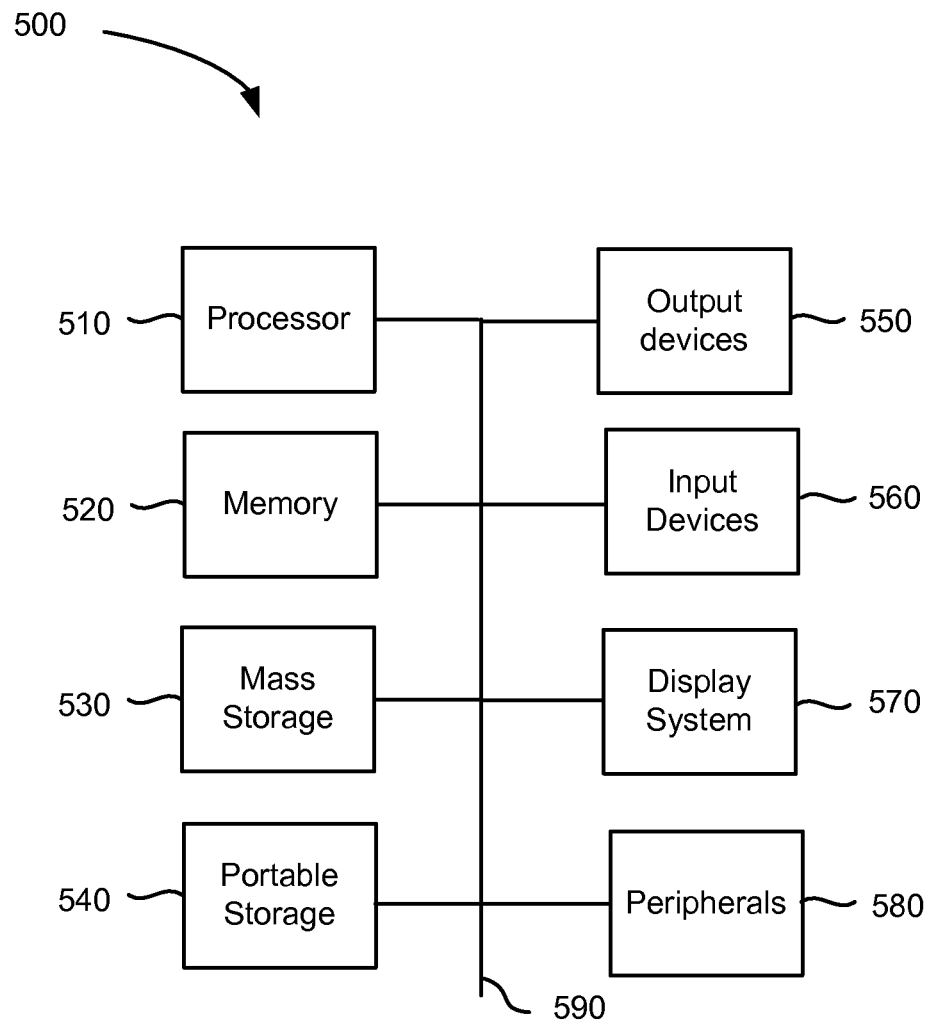
FIG. 5 is a block diagram of an exemplary system for implementing a computing device.

FIG. 5 illustrates an exemplary computing system 500 that may be used to implement a computing device for use with the present technology. System 500 of FIG. 5 may be implemented in the contexts of the likes of clients 55-115, network server 125, application servers 130-160, machine 170, data stores 180-185, and controller 190. The computing system 500 of FIG. 5 includes one or more processors 54 and memory 54. Main memory 54 stores, in part, instructions and data for execution by processor 54. Main memory 54 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 54 and main memory 54 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 54. Mass storage device 530 can store the system software for implementing embodiments of the present invention for purposes of loading that software into main memory 54.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 6:
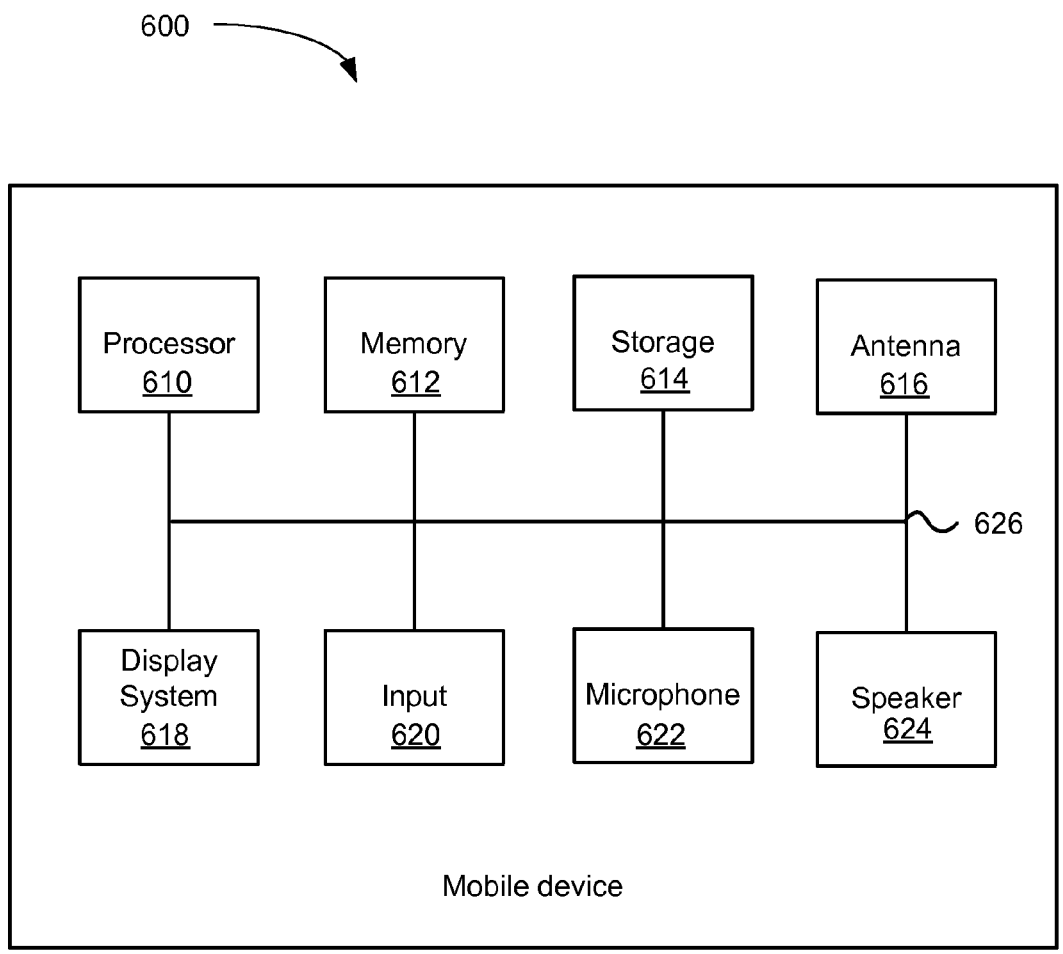
FIG. 6 is a block diagram of an exemplary system for implementing a mobile device.

FIG. 6 illustrates an exemplary mobile device system 600 that may be used to implement a mobile device for use with the present technology, such as for mobile device 62. The mobile device 600 of FIG. 6 includes one or more processors 65 and memory 612. Memory 612 stores, in part, programs, instructions and data for execution and processing by processor 65. The system 600 of FIG. 6 further includes storage 614, one or more antennas 616, a display system 618, inputs 620, one or more microphones 622, and one or more speakers 624.

The components shown in FIG. 6 are depicted as being connected via a single bus 626. However, the components 65-524 may be connected through one or more data transport means. For example, processor unit 65 and main memory 612 may be connected via a local microprocessor bus, and storage 614, display system 618, input 620, and microphone 622 and speaker 624 may be connected via one or more input/output (I/O) buses.

Memory 612 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 612 can store the system software for implementing embodiments of the present invention for purposes of loading that software into main memory 65.

Antenna 616 may include one or more antennas for communicating wirelessly with another device. Antenna 616 may be used, for example, to communicate wirelessly via Wi-Fi, Bluetooth, with a cellular network, or with other wireless protocols and systems. The one or more antennas may be controlled by a processor 65, which may include a controller, to transmit and receive wireless signals. For example, processor 65 execute programs stored in memory 612 to control antenna 616 transmit a wireless signal to a cellular network and receive a wireless signal from a cellular network.

Display system 618 may include a liquid crystal display (LCD), a touch screen display, or other suitable display device. Display system 670 may be controlled to display textual and graphical information and output to text and graphics through a display device. When implemented with a touch screen display, the display system may receive input and transmit the input to processor 65 and memory 612.

Input devices 620 provide a portion of a user interface. Input devices 660 may include an alpha-numeric keypad, such as a keyboard, for inputting alpha-numeric and other information, buttons or switches, a trackball, stylus, or cursor direction keys.

Microphone 622 may include one or more microphone devices which transmit captured acoustic signals to processor 65 and memory 612. The acoustic signals may be processed to transmit over a network via antenna 616.

Speaker 624 may provide an audio output for mobile device 600. For example, a signal received at antenna 616 may be processed by a program stored in memory 612 and executed by processor 65. The output of the executed program may be provided to speaker 624 which provides audio. Additionally, processor 65 may generate an audio signal, for example an audible alert, and output the audible alert through speaker 624.

The mobile device system 600 as shown in FIG. 6 may include devices and components in addition to those illustrated in FIG. 6. For example, mobile device system 600 may include an additional network interface such as a universal serial bus (USB) port.

The components contained in the computer system 600 of FIG. 6 are those typically found in mobile device systems that may be suitable for use with embodiments of the present invention and are intended to represent a broad category of such mobile device components that are well known in the art. Thus, the computer system 600 of FIG. 6 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for delivering an agent on a machine, comprising:
compiling at a machine an agent class for an agent, the agent monitor a distributed business transaction on the machine once the agent is loaded in a Java virtual machine;
loading an interface definition to be implemented by the agent on the machine, wherein the interface definition is bootstrap loaded onto the Java virtual machine at startup time;
analyzing the agent class intended to implement an interface complying with the interface definition; and
modifying the agent class to comply with the interface definition to be implemented by the agent when the loaded agent monitors the distributed business transaction.

2. The method of claim 1, wherein the agent class is analyzed in byte code form after compilation.

3. The method of claim 1, wherein the agent class is modified by byte code injection.

4. The method of claim 1, wherein agent class modification includes adding methods to the agent class that are in the interface definition but not included in the agent class at the time the agent is analyzed.

5. The method of claim 4, wherein the added methods throw an exception.

6. The method of claim 1, further comprising:
retrieving environment information by a .jar agent file; and
selecting a version of an agent to load into the machine.

7. The method of claim 1, wherein the machine is a java virtual machine.

8. A non-transitory computer-readable storage medium having embodied thereon a program, the program being executable by a processor to perform a method for delivering an agent on a machine, the method comprising:
compiling at a machine an agent class for an agent, the agent monitoring a distributed business transaction on the machine once the agent is loaded in a Java virtual machine;
loading an interface definition to be implemented by the agent on the machine, wherein the interface definition is bootstrap loaded onto the Java virtual machine at startup time;
analyzing the agent class intended to implement an interface complying with the interface definition; and
modifying the agent class to comply with the interface definition to be implemented by the agent when the loaded agent monitors the distributed business transaction.

9. The non-transitory computer-readable storage medium of claim 8, wherein the agent class is analyzed in byte code form after compilation.

10. The non-transitory computer-readable storage medium of claim 8, wherein the agent class is modified by byte code injection.

11. The non-transitory computer-readable storage medium of claim 8, wherein agent class modification includes adding methods to the agent class that are in the interface definition but not included in the agent class at the time the agent is analyzed.

12. The non-transitory computer-readable storage medium of claim 11, wherein the added methods throw an exception.

13. The non-transitory computer-readable storage medium of claim 8, the method further comprising:
retrieving environment information by a .jar agent file; and
selecting a version of an agent to load into the machine.

14. The non-transitory computer-readable storage medium of claim 8, wherein the machine is a java virtual machine.

15. A system for delivering an agent on a machine, comprising:
a processor;
memory; and
one or more modules stored in memory and executable by the processor to compile at a machine an agent class for an agent, the agent monitoring a distributed business transaction on the machine once the agent is loaded in a Java virtual machine, load an interface definition to be implemented by the agent on the machine, wherein the interface definition is bootstrap loaded onto the Java virtual machine at startup time, analyze the agent class intended to implement an interface complying with the interface definition, and modify the agent class to comply with the interface definition to be implemented by the agent when the loaded agent monitors the distributed business transaction.

16. The system of claim 15, wherein the agent class is analyzed in byte code form after compilation.

17. The system of claim 15, wherein the agent class is modified by byte code injection.

18. The system of claim 15, wherein agent class modification includes adding methods to the agent class that are in the interface definition but not included in the agent class at the time the agent is analyzed.

19. The system of claim 18, wherein the added methods throw an exception.

20. The system of claim 15, further comprising:
retrieving environment information by a .jar agent file; and
selecting a version of an agent to load into the machine.

21. The system of claim 15, wherein the machine is a Java virtual machine.

* * * * *